United States Patent [19]
Smith

[11] Patent Number: 5,393,345
[45] Date of Patent: Feb. 28, 1995

[54] RESPRAY OF OVERSPRAY OF ANY ATOMIZABLE LIQUID WITH JET VENTURI INDUCTION PUMP

[76] Inventor: William C. Smith, 7701 Whiterim Ter., Potomac, Md. 20854

[21] Appl. No.: 159,267

[22] Filed: Nov. 30, 1993

[51] Int. Cl.⁶ .............................................. B05B 9/03
[52] U.S. Cl. ..................................... 118/312; 118/326
[58] Field of Search ............... 118/323, 309, 312, 326, 118/602, 600, DIG. 7; 239/311, 318, 347, 354

[56] References Cited

U.S. PATENT DOCUMENTS

| | | | |
|---|---|---|---|
| 1,897,173 | 2/1933 | Long et al. | 239/8 |
| 2,101,922 | 12/1937 | Stoesling | 91/45 |
| 2,438,471 | 3/1948 | Ball | 91/45 |
| 3,811,409 | 5/1974 | Porter | 118/314 |
| 4,174,070 | 11/1979 | Lau et al. | 239/347 |
| 4,266,504 | 5/1981 | Roesner | 118/DIG. 7 |
| 4,354,451 | 10/1982 | Vöhringer et al. | 118/326 |
| 4,664,060 | 5/1987 | Roberts | 118/326 |
| 4,850,809 | 7/1989 | Smith | 417/76 |
| 4,926,924 | 5/1990 | Brooks et al. | 118/312 |

OTHER PUBLICATIONS

AirVerter product brochure, Air Verter, Beltsville, Md., undated.
Cedoz, R. and Treuschel, J., HPLV, the "Wonder" Gun. Industrial Finishing, pp. 16–18, Jun. 1993.

*Primary Examiner*—James C. Housel
*Assistant Examiner*—Rachel Heather Freed
*Attorney, Agent, or Firm*—William S. Ramsey

[57] ABSTRACT

This invention reduces the air pollution associated with spraying of paints, coatings, solvents or pesticides against a surface. Spraying invariable causes bounceback of sprayed solids as well as overspray consisting of bounceback and an aerosol of solids, solvent, and air and is an important source of air pollution. This invention is a resprayer consisting of a jet venturi induction pump located near the front of a spray gun which captures the overspray and a respray nozzle which redeposits the captured material on the work surface.

14 Claims, 7 Drawing Sheets

RESPRAY OF OVERSPRAY OF ANY ATOMIZABLE LIQUID WITH JET VENTURI INDUCTION PUMP

BACKGROUND OF THE INVENTION

This invention relates to atomization and application of fluids, such as paints, to a surface and to apparatus which minimizes loss of such fluids into the atmosphere.

Airless spraying equipment operate using pressures of 1800 to 2500 psig. Through the use of hydraulic pressure, the fluid is conveyed to a spraying apparatus where it is forced through a small orifice. The high pressure by which it is propelled is responsible for "bounceback" whereby the fluid literally bounces back into the atmosphere of the work place. It contaminates the environment, the worker, and the equipment.

The most prominent method of spraying a liquid or a powder is to use a high pressure gas, such as air, to entrain and carry the liquid or powder to a substrate or target. The high pressure gas explodes into the atmosphere creating a turbulence and finely particulates the solids. This turbulence dispenses the particles over a large area producing a deleterious fog or mist of toxic fumes and harmful solids. The danger to the worker, to the environment, and to cost containment is obvious.

Conventional pneumatic spraying apparatus use high pressure, low volume compressor air at 50 to 60 psig and 4 or 5 cfm in concert with an air regulator to atomize fluids. Spraying with such an apparatus produces a wasteful cloud of fluid and air commonly referred to as "overspray". Overspray is created by the explosive expansion of the mixture of solids, liquids, and gas at the nozzle. Overspray contains an aerosol of fluid drops and solid particles including drops of less than 10 microns in diameter. Solvents in the fluid being sprayed are referred to as volatile organic compounds (VOC). VOC entrained in overspray rapidly evaporates. The VOC become part of the atmosphere and present a hazard to the environment and to the operator.

Low pressure high volume (LPHV) spraying apparatus uses air at a low pressure (up to 10 psig) and high volume (up to 22 cfm). LPHV spraying reduces the incidence of bounceback because the fluid sprayed contacts the surface at a relatively low velocity. LPHV spraying reduces the incidence of overspray because the explosive expansion atomization of fluid which produces the aerosol is minimized when low pressure air is used.

In conventional usage, "overspray" is used as a generic term which includes bounceback and overspray as described above, and is sometimes called errant spray. This generic usage will be used here.

U.S. Pat. No. 4,850,809, incorporated herein by reference, discloses an apparatus for LPHV spraying.

The measurement for comparing methods of atomization is called transfer efficiency (T.E.). T.E. is expressed as a percentage of the solid substances that become part of a substrate or arrive at the intended target. Conventional pneumatic spraying has a T.E. of 25%; airless spraying has a T.E. of 40%; and LPHV spraying has a T.E. of 75%.

The Environmental Protection Agency has expressed special concern about the hazards associated with airborne particles of a diameter of 10 microns or less ($PM_{10}$). That Agency has established regulations controlling $PM_{10}$ concentrations in outdoor applications, such as shipbuilding, bridges, towers, and architectural coatings. The production of $PM_{10}$ is virtually uncontrollable when conventional spraying methods are used.

The production of VOC is often regulated in terms of tons VOC/day emitted per site. A typical spray booth is ventilated by a flow of air at 150 $ft^3$/minute per $ft^2$ surface being painted. The contaminated air is then treated to remove the VOC and $PM_{10}$, often by incineration, a very expensive process.

Two trends have emerged from efforts to protect the environment from solvents and aerosols resulting from overspray. In order to prevent bounceback spraying pressures are limited to 10 psig in some locations. In order to reduce solvent entry into the atmosphere, fluid formulations containing as much as 70% solids are often used.

The present invention captures and resprays the overspray, thereby increasing the transfer efficiency of the process and reducing the air pollution due to VOC and $PM_{10}$ associated with spraying.

The respray system reduces the total amount of pigment needed by capturing and reapplying pigment which otherwise would be lost in overspray. In addition, the recycle of VOC prevents stripping of solvent from pigment during spraying, which results in undesirable premature drying of the sprayed paint. This will result in a net reduction of volume of solvents which must be used for a given amount of pigment.

U.S. Pat. No. 2,438,471 discloses a curtain of air introduced around the spray nozzle which traps the rebounding portions of the coating mixture and forces it against the surface being coated. The air curtain is emitted through a series of holes in an annular air chamber extending entirely around the spray nozzle.

U.S. Pat. No. 1,897,173 discloses a cap like spray nozzle in which a central stream of liquid is surrounded by an annular air port. The liquid stream is modified by two opposed supplemental air ports which shape the emitted spray into a fairly sharply defined ellipsoid cross-section.

U.S. Pat. No. 2,101,922 discloses an apparatus for spraying melted paraffin onto porous surfaces. The stream of paraffin is surrounded by a sheath of heated air. One venturi arrangement is used to atomize and propel the paraffin is a stream of air while a second concentric venturi is used to provide the sheath of heated, low-pressure air.

U.S. Pat. No. 4,664,060 discloses a paint spray booth for painting motor vehicles. A venturi is used to intermix paint particle-bearing air and water in order to scrub the paint particles from the air.

There is a continuing need for spraying apparatus which will allow spraying of atomizable liquids at a high transfer efficiency and minimal air pollution.

SUMMARY OF THE INVENTION

This invention uses a jet venturi induction pump to both trap and respray overspray associated with spraying of atomizable fluids. The jet venturi induction pump delivers respray at a pressure of about 10 psig. In a preferred embodiment, a respray apparatus is mounted on either side of the nozzle of a high volume low pressure type spray gun. A variety of configurations of respray apparatuses may be mounted about a spray gun.

In a second embodiment, a conical respray apparatus uses a double sided-respray nozzle to convey respray to an annular respray orifice.

The objective of this invention is to increase the transfer efficiency of spraying atomizable liquid.

Another objective of this invention is to reduce the amount of overspray which enters the environment.

Another objective of this invention is to reduce the emission of toxic substances associated with spraying of atomizable liquids.

Another objective of this invention is to increase the thickness of coatings produced by spraying atomizable liquids.

Another objective of this invention is to increase the smoothness of coatings obtained by spraying atomizable liquids.

Another objective of this invention is to reduce the amount of VOC emitted into the atmosphere by spraying processes.

Another objective of this invention is to reduce the amount of paint required to coat an object by spraying.

A final objective of this invention is to reduce the amount of airflow required to remove overspray and VOC from a spray booth.

DESCRIPTION OF THE PREFERRED EMBODIMENTS

In this application, the term "atomizable liquid" means liquids such as paints, solvents, lubricants, fuels, pesticides, as well as sprayable flowable powders, such as pigments.

Figure 1:
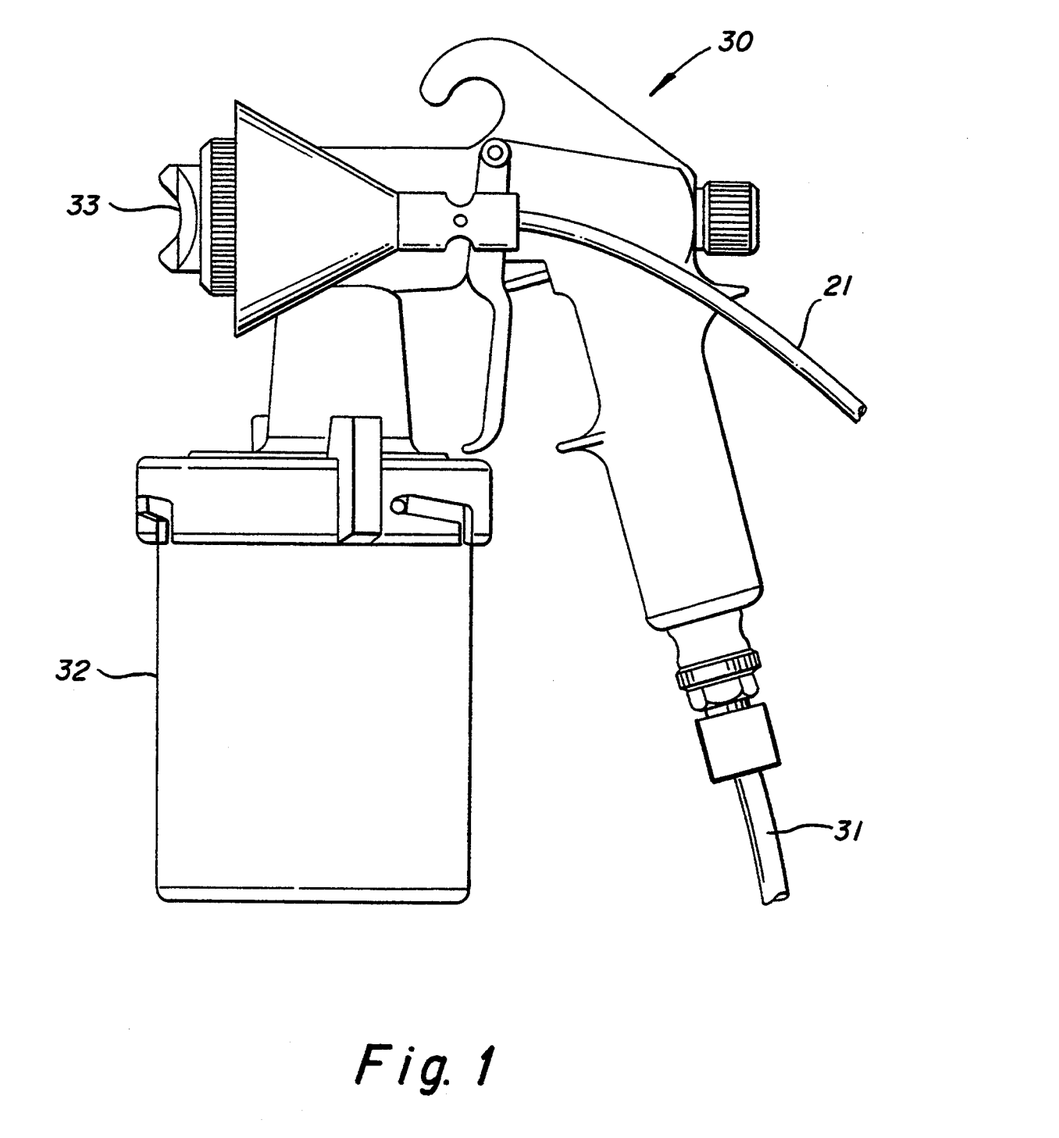
FIG. 1 is a side view of the respray apparatus attached to a spray gun.

FIG. 1 shows the respray apparatus 10 mounted on the side of a conventional spray gun 30. A preferred sprayer is a high volume low pressure type of sprayer in which the spray is emitted at about 10 psig. The spray gun 30 has an attached container 32 for atomizable liquids to be sprayed, a nozzle 33 for emitted atomizable liquid, and a air conduit 31 attached to a supply of compressed air.

Figure 2:
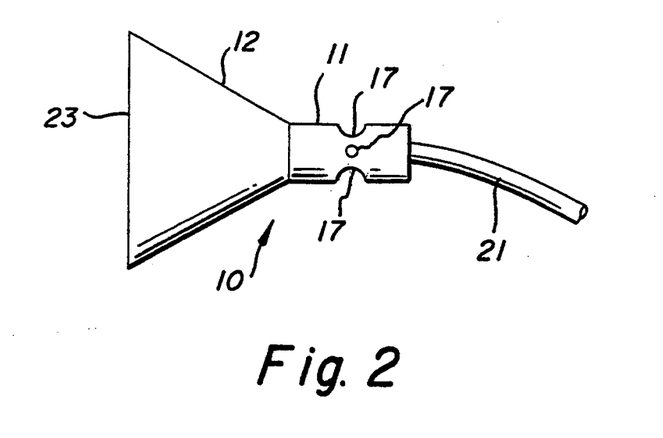
FIG. 2 is a side view of the respray apparatus.

FIG. 2 shows a side view of a respray apparatus 10. A jet venturi induction pump 11 has attached at its outlet end a respray nozzle 12. Attached to the inlet end of the jet venturi induction pump is an air supply conduit 21, which is attached to a compressed air supply. A conventional air compressor may be used to provide compressed air. A respray orifice 23 is at the end of the respray nozzle.

Figure 3:
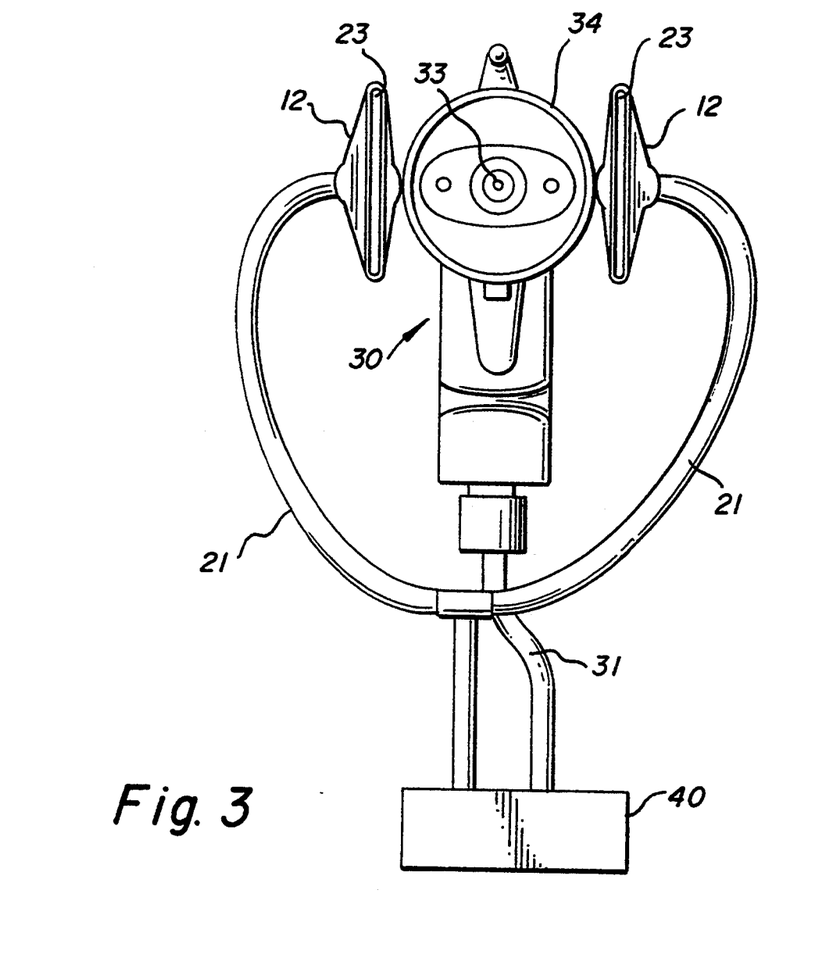
FIG. 3 is a front view of a spray gun with two respray apparatuses.

FIG. 3 is a end view of a conventional spray gun 30 without liquid container with two respray apparatuses 10 attached. The respray apparatuses are attached on opposed sides to a mounting ring 34 which surrounds the spray gun nozzle 33. FIG. 3 shows the respray orifices 23, respray nozzles 12, and air supply tubes 21 of the respray apparatuses. The air supply conduits 21 of the respray apparatuses as well as the air supply conduit of the spray gun 31 are shown diagramatically as attached to air compressor 40.

Figure 4:
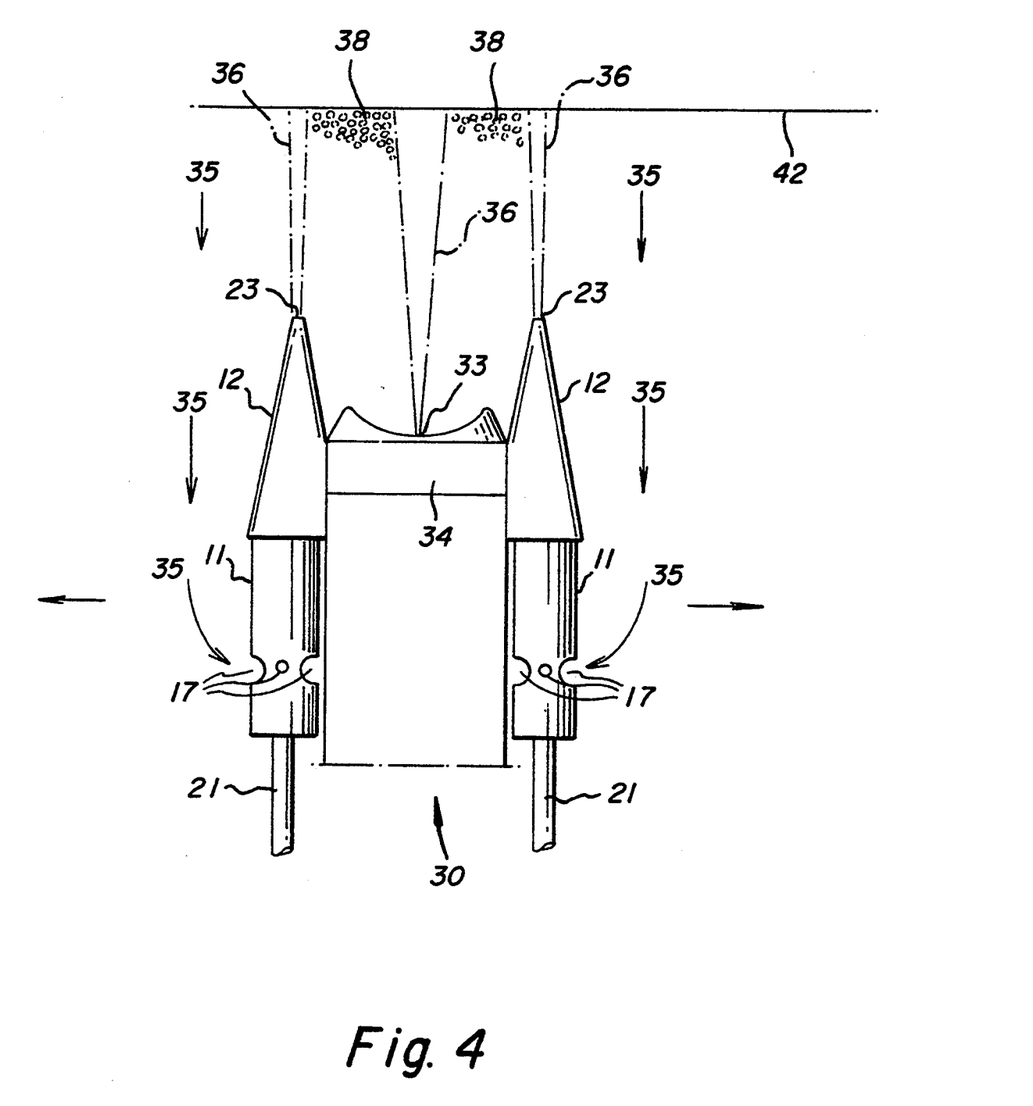
FIG. 4 is a top view of a spray gun with two respray apparatuses.

FIG. 4 is a top view of a spray gun with two attached respray apparatuses. The spray gun 30 has a mounting ring 34 which encircles the gun at the nozzle 33 end. Attached to the mounting ring 34 are two respray apparatuses 10 each consisting of a jet venturi induction pump 11 having induction duct ports 17 and a respray nozzle 12 with respray orifice 23. An air supply conduit 21 is attached to the end of the jet venturi induction pump.

FIG. 4 shows the respray apparatus in operation. The spray gun is used to spray atomizable liquid 36 against a work piece 42. Some portion of the atomizable liquid sprayed enters the atmosphere as overspray 38. In operation of the respray apparatuses air containing overspray, indicated by arrows 35, is sucked or drawn into the induction duct ports 17. This overspray is then immediately resprayed 36 onto the work piece 42 at a pressure not over 10 psig.

A preferred jet venturi induction pump, sometimes referred to as a induction pump is disclosed in U.S. Pat. No. 4,850,809, incorporated herein by reference. The jet venturi induction pump is 11 in FIGS. 3 and 4 in that patent.

Figure 9:
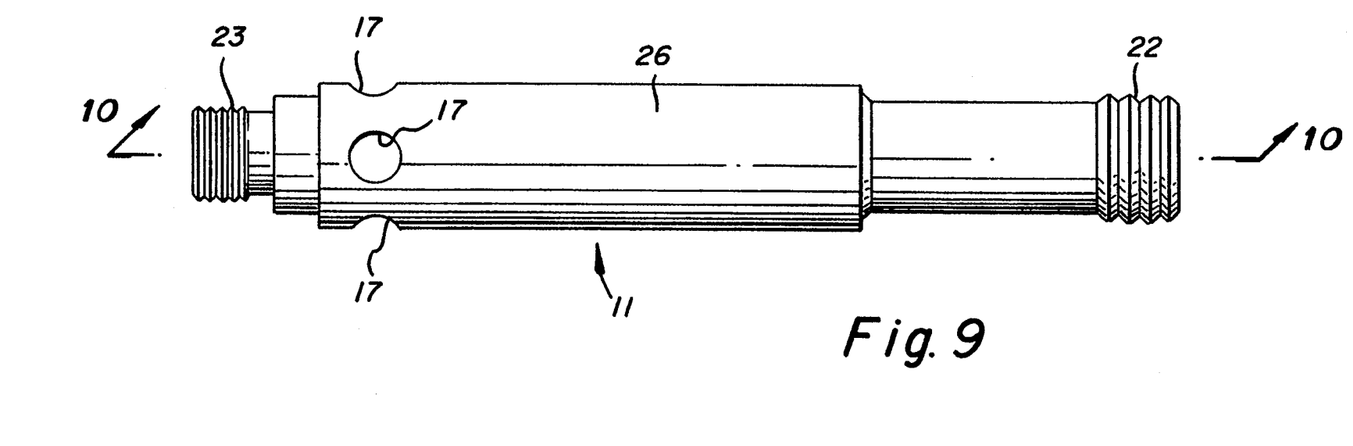
FIG. 9 is a side elevation of a jet venturi induction pump.

FIG. 9 is a side elevation of the jet venturi induction pump 11. The pump has an elongated cylindrical body 26 with an inlet coupling 23 which is attached to the output of the air pump and an outlet coupling 22 which is attached to the respray nozzle 12. In this preferred embodiment, four induction duct ports 17 arrayed about or along the circumference of the jet venturi induction pump at the end nearest the inlet coupling. The number of induction duct ports may range from one to a multiplicity.

Figure 5:
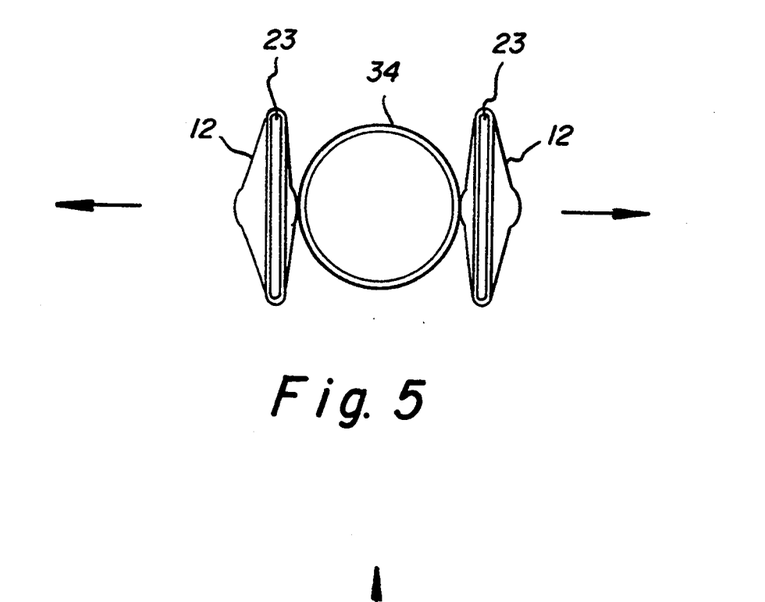
FIG. 5 is an end view of a mounting ring with two respray apparatuses.

FIG. 5 is a front view of a mounting ring 34 with two respray apparatuses mounted on it. The respray nozzles 12 and respray orifices 23 are visible. The arrows indicate the lateral motion of a spray gun equipped with these respray apparatuses when a fan-shaped spray plume is used. The respray apparatuses are mounted so the respray orifice is parallel to the long axis of the fan shaped spray plume. The apparatuses of FIG. 5 would be used with a spray gun with a vertical fan-shaped plume which would be used with a lateral side-to-side motion.

Figure 6:
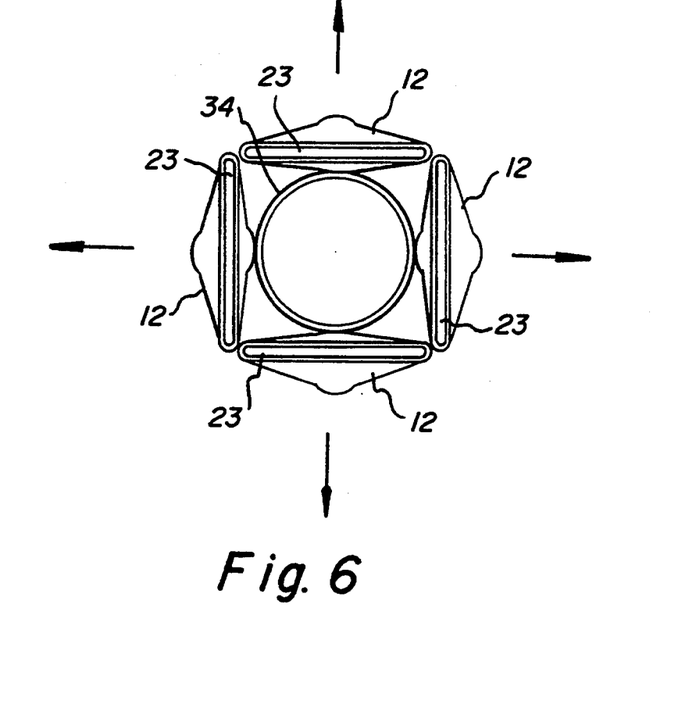
FIG. 6 is an end view of a mounting ring with four respray apparatuses.

FIG. 6 is a front view of a mounting ring 34 with four respray apparatuses mounted on it. The respray nozzles 12 and respray orifices 23 are visible. The arrows indicate that the motion of a spray gun equipped with these respray apparatuses would be in all directions. This arrangement would be used with a circular-shaped spray plume.

Figure 7:
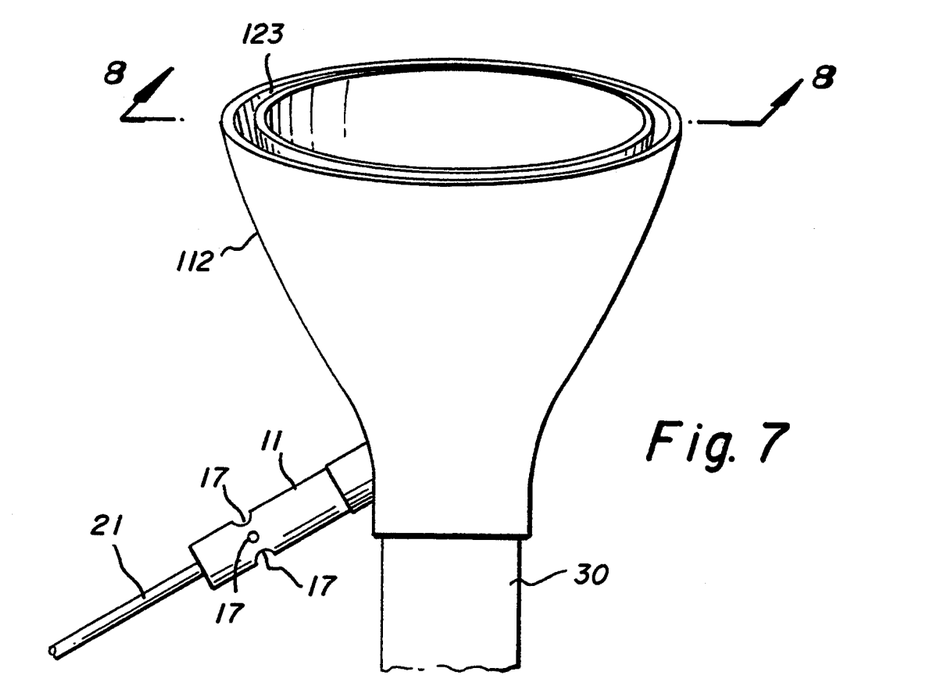
FIG. 7 is a side view of a second embodiment respray apparatus mounted on a spray gun.

FIG. 7 shows a side view of a second embodiment respray apparatus. In this embodiment, a conical shaped respray nozzle 112 has a inner and outer wall and a annular respray orifice 123. A jet venturi induction pump 11 is attached to the respray nozzle. Induction duct ports 17 are shown on the jet venturi induction pump and an air supply conduit 21 is attached to the jet venturi pump. The second embodiment respray apparatus is in the form of a hollow cone which slides over the nozzle end of a spray gun 30 and is retained on the spray gun nozzle by a friction fit.

Figure 8:
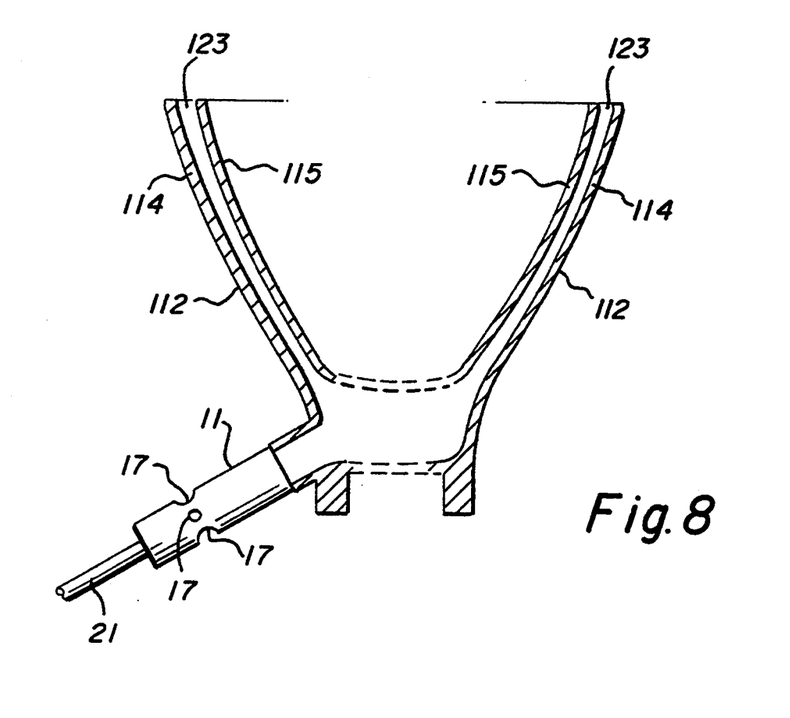
FIG. 8 is a cross section of a second embodiment respray apparatus mounted on a spray gun.

FIG. 8 is a cross section of the second embodiment respray apparatus taken along arrows 8. The jet venturi induction pump 11, induction duct ports 17 and air supply conduit 21 are shown. This embodiment respray nozzle 112 consists of an outer wall 114 and a inner wall 115 which define an annular respray orifice 123.

In use, the second embodiment respray apparatus resprays into an annular curtain of air which surrounds the spray plume of the spray gun.

Figure 10:
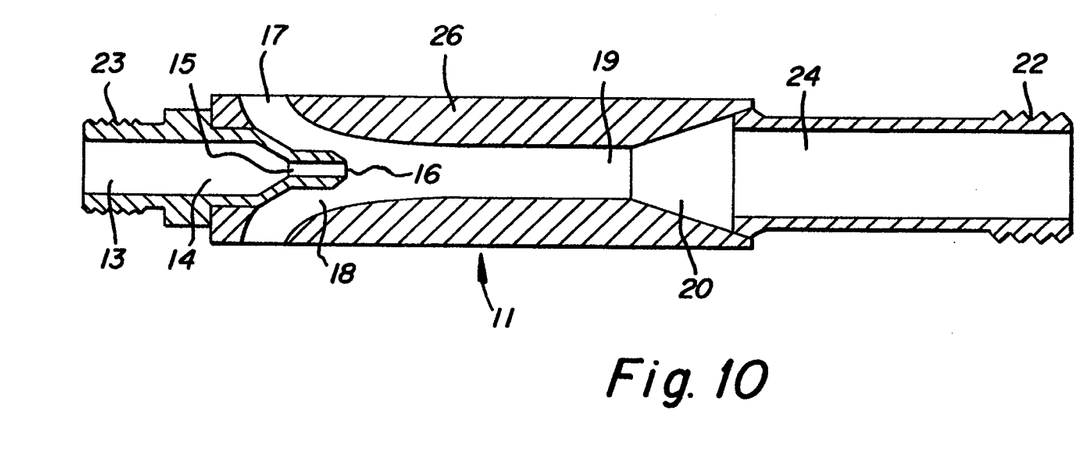
FIG. 10 is a cross section of the jet venturi induction pump of FIG. 9 taken along arrows 9.

FIG. 10 is a central longitudinal cross sectional view of the jet venturi induction pump 11. The jet venturi induction pump is connected with the outlet of the air pump via inlet coupling 23. Air from the air pump enters the jet venturi induction pump through the nozzle entrance area 13. At region 14 the air from the air pump converges at the throat of the venturi nozzle 15, wherein the air pump air velocity is maximized, thereby reducing pressure, temperature, and humidity. The high velocity causes below ambient pressure air to exit at 16, which is called the free jet area. The region 16 may also be described as a low pressure field. At this point, external air received at one atmosphere pressure flows to the low pressure field region 16 through induction duct ports 17. The external ambient air contains overspray from the surface of the work being sprayed. The ambient air mixes with the low pressure air duct air in the upstream section of the inductor at 18 and flows toward the area 19 called the pressure recovery section where finalization of the respray air occurs at the divergent section of the venturi 20. The respray air exits the jet venturi induction pump at the outlet area 24 which is connected to the respray nozzle.

It is important to the proper operation of the jet venturi induction pump that the diameter of the nozzle entrance area 13 be approximately equal to the diameter of the pressure recovery section 19.

Figure 11:
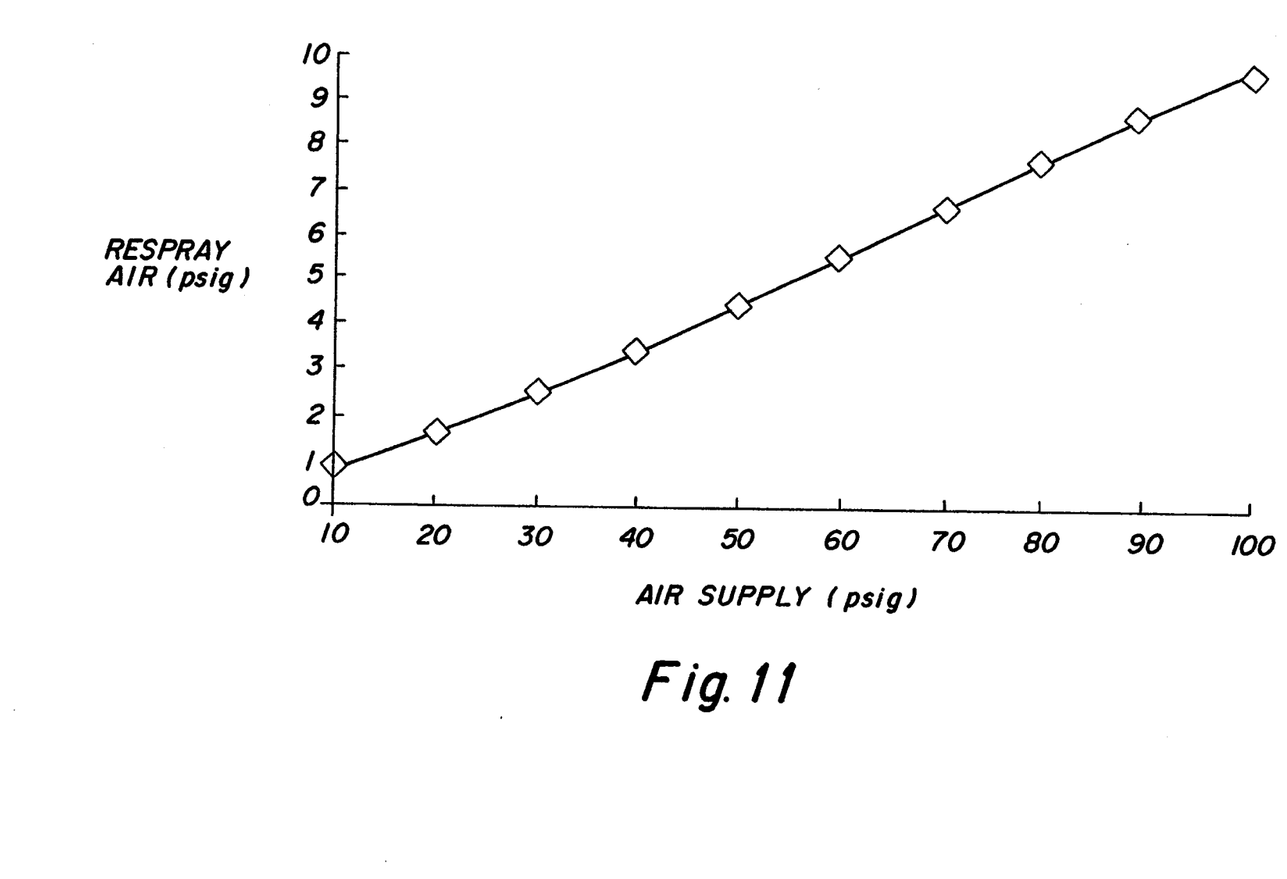
FIG. 11 shows the relation between air supply psig and respray air psig of a respray apparatus.

The pressure of the respray air is always less than the pressure in the nozzle entrance area. The ratio of pressures is dependent on the volume of respray air induced through the induction duct ports. FIG. 11 shows the relationship between the pressure of the air supplied to the jet venturi induction pump and the respray air which is emitted from the outlet area 24, FIG. 10. FIG. 11 shows the pressure of the emitted respray air does not exceed 10 psig even when the air supply is at a pressure as high as 100 psig.

It will be apparent to those skilled in the art that the examples and embodiments described herein are by way of illustration and not of limitation, and that other examples may be used without departing from the spirit and scope of the present invention, as set forth in the appended claims.

I claim:

1. An apparatus for spraying atomizable liquid onto a surface comprising:
   an air compressor,
   a spray gun having a nozzle and a container for said liquid,
   means for providing said spray gun with air from said air compressor, and
   means for capturing overspray associated with spraying said liquids onto a surface and respraying the overspray onto the surface at a pressure of no more than 10 psig, wherein the means for capturing overspray comprises;
   a jet venturi induction pump,
   a respray nozzle having a respray orifice connected to the jet venturi induction pump and located adjacent the spray gun nozzle, said respray being emitted from said respray orifice at a pressure of not more than 10 psig,
   means for providing the jet venturi induction pump with air from said compressor, and
   means for attaching said jet venturi induction pump to said spray gun.

2. The apparatus of claim 1 wherein the means for attaching the jet venturi induction pump to the spray gun is a mounting ring.

3. The apparatus of claim 1 wherein the means for capturing and respraying overspray is two jet venturi induction pumps each having an induction duct port into which overspray is drawn and each having a respray nozzle attached to said jet venturi induction pump, means for attaching said jet venturi induction pumps to said spray gun, and means for providing said jet venturi induction pumps with air from said air compressor.

4. The apparatus of claim 1 wherein the means for capturing and respraying overspray is four jet venturi induction pumps each having an induction duct port into which overspray is drawn and each having a respray nozzle attached to said jet venturi induction pump, means for attaching said jet venturi induction pumps to said spray gun, and means for providing said jet venturi induction pumps with air from said air compressor.

5. The apparatus of claim 1 wherein said overspray contains volatile organic compounds.

6. The apparatus of claim 1 wherein said overspray contains powders.

7. The apparatus of claim 1 wherein said overspray contains pigments.

8. The apparatus of claim 1 wherein said overspray contains paints.

9. The apparatus of claim 1 wherein said overspray contains lubricants.

10. The apparatus of claim 1 wherein said overspray contains fuels.

11. The apparatus of claim 1 wherein said overspray contains pesticides.

12. The apparatus of claim 1 wherein said overspray contains solvents.

13. The apparatus of claim 1 wherein the respray nozzle is conical in shape and has an outer wall and an inner wall which define an annular respray orifice.

14. The apparatus of claim 13 wherein the means for attaching said jet venturi induction pump to said spray gun is a friction fit between the hollow cone shaped respray nozzle and the spray gun.

* * * * *

UNITED STATES PATENT AND TRADEMARK OFFICE
CERTIFICATE OF CORRECTION

PATENT NO. : 5,393,345
DATED : March 3, 1995
INVENTOR(S) : William C. Smith

It is certified that error appears in the above-indentified patent and that said Letters Patent is hereby corrected as shown below:

On the title page, item [54], and Column 1, in the title after "Liquid" insert --or Powder--

Signed and Sealed this

Twenty-fifth Day of April, 1995

*Attest:*

BRUCE LEHMAN

*Attesting Officer*     *Commissioner of Patents and Trademarks*